UNITED STATES PATENT OFFICE.

WILLIAM H. PORTER, OF NEW YORK, N. Y., ASSIGNOR TO THE AIR LIGHTER COMPANY, OF SAME PLACE.

MANUFACTURE OF CATALYTIC GAS-LIGHTERS.

SPECIFICATION forming part of Letters Patent No. 612,615, dated October 18, 1898.

Application filed May 7, 1896. Renewed February 15, 1898. Serial No. 670,434. (No specimens.)

*To all whom it may concern:*

Be it known that I, WILLIAM H. PORTER, a citizen of the United States, residing in the city, county, and State of New York, have invented certain new and useful Improvements in the Manufacture of Catalytic Gas-Lighters, of which the following is a specification.

This invention relates to catalytic material and processes of making the same, and refers more especially to that kind of catalytic material that will become heated in the presence of air and illuminating-gas and also cause ignition of the latter.

This catalytic material consists of a mixture of one or more catalytic metals in a finely-divided state and one or more infusible oxids of the earth group, such as the oxids of aluminium, zirconium, and cerium. In this composition the percentage of the catalytic metal or metals may be varied from sixty to ten per cent., the remainder consisting of oxid or mixture of oxids, as aforesaid. The composition can be made in a number of ways, some of which will now be described.

One gram of platinum is dissolved in aqua-regia and one gram of metallic aluminium is dissolved in hydrochloric acid. The solution is filtered and heated in an evaporating-dish until the mass weighs three grams. An intimate mixture is then made of the platinum chlorid and the mixture of aluminium oxid and chlorid obtained by heating the solution of aluminium chlorid. The mixture is preferably applied when in the form of a thoroughly plastic paste. If not firm enough, it may be evaporated until it has the right consistence. To the mixture is added a small quantity of some reducing agent, such as any of the liquid alcohols, sugar, gelatin, oxalic acid, &c. To the mixture above named one cubic centimeter of glycerin will be sufficient, the latter having the advantage of retaining the water in the composition, and thereby preventing it from hardening, of being non-volatile at ordinary temperature, and of readily reducing the platinum chlorid to platinum-black on heating.

The following are additional formulæ for making the composition: platinum-chlorid solution, containing one gram of platinum in ten cubic centimeters of solution; ten cubic centimeters aluminium hydrate, three grams. This mixture is heated until it is converted into a dark-brown mass. One cubic centimeter of glycerin is then added.

In the latter composition the aluminium hydrate may be replaced in whole or in part by aluminium oxid, two parts of aluminium oxid corresponding to three parts of aluminium hydrate.

From the paste gas-lighters are made as follows: The paste prepared as above is applied to loose cotton until the latter becomes of a uniform dark-brown color. From the thus-prepared cotton small tufts are made, having a number of projecting fibers. These tufts are attached to an ordinary lava tip by means of any suitable cement, or they may be attached to metallic tips, such as aluminium tips, and held in the proper position in a suitable receptacle of such tip, with or without the use of a cement. The tufts are then heated to a red heat. When a mixture of air and gas strikes such a catalytic material, it commences to glow, and if it has a sharp point, such as a filament or fiber, where the mixture of gas is sufficiently intimate the fiber or filament will become sufficiently hot to cause ignition of the gas. It is not necessary that such a filament should be impregnated with catalytic metal, because if it is impregnated merely with aluminium oxid or other equivalent oxid such oxid when heated will become sufficiently catalytic to cause ignition. If, therefore, merely the base part is supplied with the mixture of finely-divided catalytic metal and oxid and the fibers are only impregnated with an earthy oxid, still such a combination of base and fiber will be sufficient to cause ignition of the gas, the base when brought in contact with air and combustible gas commencing to glow and heating the fibers, which then commence to become catalytic and become sufficiently heated to cause ignition of the gas.

In place of using loose cotton or other fibrous material the catalytic material itself when in a plastic state may be rolled out into filaments, which can be used in place of the filaments produced by impregnating various fibers, and filaments may also be produced from plastic materials of compounds of earthy metals without any catalytic metals, in which case such fibers must be attached to a base supplied with catalytic metals to start the heat, and thereby make the fibers catalytic.

In attaching the catalytic tufts to burners it is necessary that the filaments be located at the place where the mixture of air and combustible gas is most complete, as otherwise such fibers will not cause ignition.

The finely-divided platinum produced in this lighter generally consists of platinum-black, but may also consist of bright platinum, or a mixture of the two, depending upon the temperature at which the reduction has been effected.

When a cement is used, it acts as a non-conductor of heat on a metallic tip and on a lava tip prevents the catalytic material from coming in contact with the silicate of which the tip is made.

This invention is an improvement upon the invention described in my concurrent application, Serial No. 547,172, in which the catalytic composition here described is claimed broadly.

What I claim is—

1. In the art of making catalytic material the improvement which consists in mixing any desired number of salts, of catalytic metal or metals, any desired number of compounds of an earthy metal and a reducing agent, and heating the mixture until a compound of catalytic metal and earthy oxid or oxids is produced as described.

2. In the art of making catalytic material the improvement which consists in mixing any desired number of salts of catalytic metal or metals, any desired number of compounds of an earthy metal and a reducing agent with sufficient water to form a plastic paste, impregnating combustible material with such paste and heating the impregnated combustible material until the volatile and combustible ingredients are eliminated as described.

3. In the art of making catalytic material the improvement which consists in mixing any desired number of salts of platinum, any desired number of compounds of an earthy metal and a reducing agent, and heating the mixture until a compound of catalytic metal and earthy oxid or oxids is produced as described.

4. In the art of making catalytic material the improvement which consists in mixing any desired number of salts of platinum, any desired number of compounds of an earthy metal and a reducing agent with sufficient water to form a plastic paste, impregnating combustible material with such paste and heating the impregnated combustible material until the volatile and combustible ingredients are eliminated as described.

5. In the art of making catalytic material the improvement which consists in mixing any desired number of salts of platinum, an aluminium compound and a reducing agent and heating the mixture until a compound of catalytic metal and alumina is produced as described.

6. In the art of making catalytic material the improvement which consists in mixing any desired number of salts of platinum, an aluminium compound, and a reducing agent with sufficient water to form a plastic paste, impregnating combustible material with such paste and heating the impregnated combustible material until the volatile and combustible ingredients are eliminated as described.

7. A lighting-tuft consisting of a base composed of any desired number of catalytic metals in a finely-divided state and any desired number of earthy oxids and filaments or fibers of earthy oxid or oxids as described.

8. A lighting-tuft consisting of a base composed of platinum in a finely-divided state and any desired number of earthy oxids and filaments or fibers of earthy oxid or oxids to which filaments heat is conducted by the base as described.

9. A lighting-tuft consisting of a base composed of platinum in a finely-divided state and alumina and filaments or fibers of earthy oxid or oxids to which filaments heat is conducted by the base as described.

10. A catalytic material consisting of a mixture of platinum-black, reguline platinum and any desired number of earthy oxids as described.

11. A catalytic material consisting of a mixture of platinum-black, reguline platinum and alumina as described.

12. A gas-lighter consisting of catalytic material a gas-tip and an insulating-cement between the tip and lighter.

In testimony whereof I have signed my name to this specification in the presence of two subscribing witnesses.

WILLIAM H. PORTER.

Witnesses:
CLAUDE A. O. ROSELL,
EDWARD R. MEEK.